United States Patent
Lakshminarasimhan (10) Patent No.: US 7,516,144 B2
(45) Date of Patent: Apr. 7, 2009

(54) METHOD AND SYSTEM FOR RE-POPULATION OF DATA IN A DATABASE

(75) Inventor: Muralidharan Kanchi Lakshminarasimhan, Bangalore (IN)

(73) Assignee: Vaakya Technologies Private Limited, Bangalore, Karnataka (IN)

( * ) Notice: Subject to any disclaimer, the term of this patent is extended or adjusted under 35 U.S.C. 154(b) by 216 days.

(21) Appl. No.: 11/535,491

(22) Filed: Sep. 27, 2006

(65) Prior Publication Data
US 2007/0100791 A1  May 3, 2007

(30) Foreign Application Priority Data
Oct. 28, 2005  (IN) ................ 1574/CHE/2005

(51) Int. Cl.
*G06F 17/00* (2006.01)
(52) U.S. Cl. .................... 707/101; 707/104.1
(58) Field of Classification Search .......... 707/1, 707/100, 200
See application file for complete search history.

(56) References Cited

U.S. PATENT DOCUMENTS

| | | | |
|---|---|---|---|
| 6,366,917 | B1 | 4/2002 | St. John Herbert, III |
| 6,636,846 | B1 | 10/2003 | Leung et al. |
| 2003/0217027 | A1 | 11/2003 | Farber et al. |
| 2004/0199517 | A1* | 10/2004 | Casati et al. ................ 707/100 |
| 2005/0172261 | A1 | 8/2005 | Yuknewicz et al. |
| 2005/0216520 | A1* | 9/2005 | He et al. ..................... 707/200 |
| 2005/0235003 | A1* | 10/2005 | Folkert et al. ............... 707/201 |

OTHER PUBLICATIONS

Vaakya Complete Tutorial—Session 8: Triggers and Repost [online] Vaakya Technologies Pvt. Ltd., 2006 (retrieved on Mar. 21, 2007). Retrieved from the Internet:<URL:http://www.vaakya.com/tutorial/Htmltutorial/> session 8.

* cited by examiner

*Primary Examiner*—Uyen T. Le
(74) *Attorney, Agent, or Firm*—Prakash Nama; Global IP Services, PLLC (57) ABSTRACT

A method for automatic re-population of data in a database in response to detection of at least one script-transaction, the database includes a plurality of tables. The script-transaction is carried out in response to a script input. The method includes truncating at least one table, which is being modified by at least one of a persistent trigger and a non-persistent trigger. The persistent trigger updates a table and the non-persistent trigger performs one of an insert operation and a delete operation on a table. Further, the method includes executing a non-persistent trigger corresponding to each truncated table of the database in a predefined-update-sequence. Also, the method includes executing at least one persistent trigger corresponding to each truncated table of the database.

12 Claims, 5 Drawing Sheets

METHOD AND SYSTEM FOR RE-POPULATION OF DATA IN A DATABASE

FIELD OF THE INVENTION

The invention relates generally to a database management system. More particularly, the invention relates to re-population of data in a database.

BACKGROUND OF THE INVENTION

Conventionally, in various data driven applications the data is stored in flat files or using one of the database management system like network databases, relational databases or object databases. The database management system contains transactional, financial and customer information that are crucial for an organization. As an organization grows, the database management system needs to be updated either with updated data or with database structural changes.

There exists several database change management system that manages database change via manual process using upgrade scripts. The upgrade scripts have instructions that are carried out in order to manage database changes. This involves software developers to write upgrade scripts for changes to database code, schema and static data. Also, software developer are required to write a corresponding downgrade script that may be required to revert back to original database in case the upgrade fails.

Another conventional approach requires creating a new database upon which the upgrade scripts are executed providing an empty schema. A data re-population process is executed upon the new database. The data re-population process involves extracting each data from an original database and loading onto the new database.

However, the above-mentioned methods are time consuming and expensive as they require manual intervention. Further, a back up for the complete data of the database is required in order to carry out data migration, data re-population or data replication from an original database to a new database. This requires an additional disk space and migration of huge data might consume additional network traffic.

There is therefore, a need of a method and system for automatic re-population of data in a database.

SUMMARY

An aspect of the invention is to provide a system and method for automatic re-population of data in a database.

In order to fulfill the above aspects, the method comprises truncating at least one table, which is being modified by at least one of a persistent trigger and a non-persistent trigger. The persistent trigger updates a table and the non-persistent trigger performs one of an insert operation and a delete operation on the table. The method further comprises executing the non-persistent trigger corresponding to each truncated table of the database in a predefined-update-sequence. Also, the method comprises executing at least one persistent trigger corresponding to each truncated table of the database.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Various embodiments of the invention provide methods and systems for automatic re-population of data in a database. The re-population of data in a database may be required when there is a change in a business rule of an organization that governs the data in the database, when there is a change in the database structure, or when there is change in the structure of a table of the database. The change in business rule can be, for example, change in taxation or introduction of new tax rules, merging databases of two organizations during merger. The change in the database structure can be, for example, an introduction of a new table in the database. The change in the structure of a table can be, for example, inserting a new column in the table. Further, the re-population of data may be required for bug-fixing, resolution of defects and performance tuning, for example, denormalization.

Figure 1:
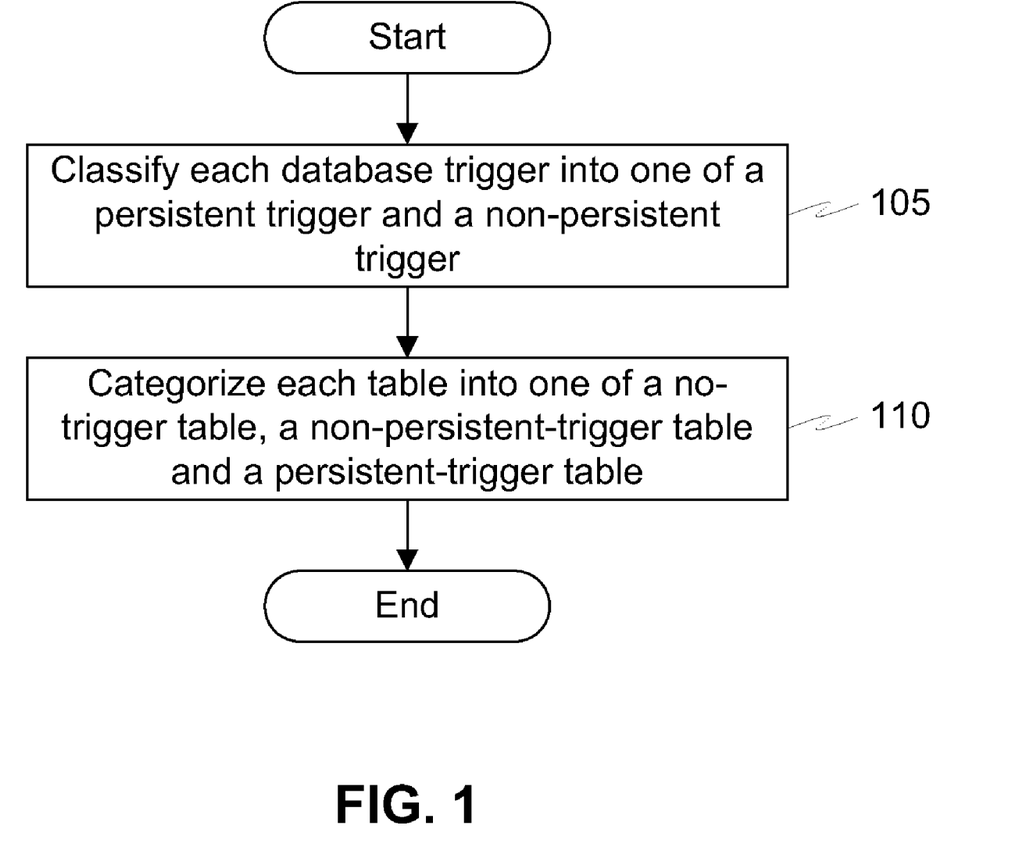
FIG. 1 is a flow diagram of a method for enabling automatic-repopulation of data in a database, in accordance with an embodiment of the invention.

FIG. 1 is a flow diagram for enabling automatic-repopulation of data in a database, in accordance with an embodiment of the invention. The database comprises a plurality of tables and a plurality of database triggers. A database trigger is a set of synchronous structured query language (SQL) statements that execute automatically when a specific operation, such as changing data in a table, occurs. The database triggers are used for automatically initiating update, delete and insert statement that must be executed on a regular basis based on an occurrence of a pre-defined event. The pre-defined event can be, for example, purchase of a product, a database trigger can be defined to update an inventory data whenever a product is purchased. Further, the database triggers can be used for example, for maintaining referential integrity and data consistency, enforcing business rules, validating data that is being modified or updated in the database. At step 105, each database trigger is classified into one of a persistent trigger and a non-persistent trigger.

The persistent trigger generally refers to a database trigger that can update a data stored in a table of a database. For example, a database comprises a table A that stores data corresponding to the sales details of items and a Table B that stores data corresponding to stock of the items. If a sale of an item is made, an entry is inserted in the table A pertaining to the sale. The entry can comprise information pertaining to the quantity of the item sold. As a result of the sale, the stock of the item needs to be updated in the table B. In order to update the data in the table B, a persistent trigger is executed by the table A to update the stock information in the table B.

The non-persistent trigger generally refers to a database trigger that can perform an insert or a delete operation on a table of the database. Further, the non-persistent trigger may also update the data in a table of the database. For example, a database comprises a table C that stores data corresponding to items and a table D that stores data corresponding to the stock of the items. If a new entry is inserted in the table C pertaining to a new item, a corresponding entry in the table D has to be made for maintaining the referential consistency of the data. The new entry can comprise data pertaining to an item-code, an item-name or an item-opening-quantity. A non-persistent trigger is executed by the table C to insert a corresponding new entry in the table D. In another scenario, if an item is removed from the table C, then a non-persistent trigger is executed by the table C to delete the corresponding entry in the table D. In yet another scenario, if an item-opening-quantity of an item is updated in the table C, then a non-persistent trigger is executed by the table C to update the data pertaining to stock of the item in the table D.

At step 110, each table is categorized into one of a no-trigger-table, a non-persistent-trigger-table and a persistent-trigger-table. Each table in the database is categorized on the basis of the type of the database trigger that is executed on the table. A table that is not modified by any database-trigger is categorized as no-trigger-table. A table that is modified by a non-persistent trigger is categorized as a non-persistent-trigger-table. A table that is modified by a persistent-trigger is categorized as a persistent-trigger-table. The tables that are categorized as no-trigger-table are referred as primary tables. Further, the tables that are categorized as persistent-trigger-table or a non-persistent-trigger-table are referred as secondary tables.

Generally a table can be modified by a plurality of persistent triggers and at most one non-persistent trigger. If a table is modified by both a persistent trigger and a non-persistent trigger, the table is categorized as a non-persistent-trigger-table.

Figure 2:
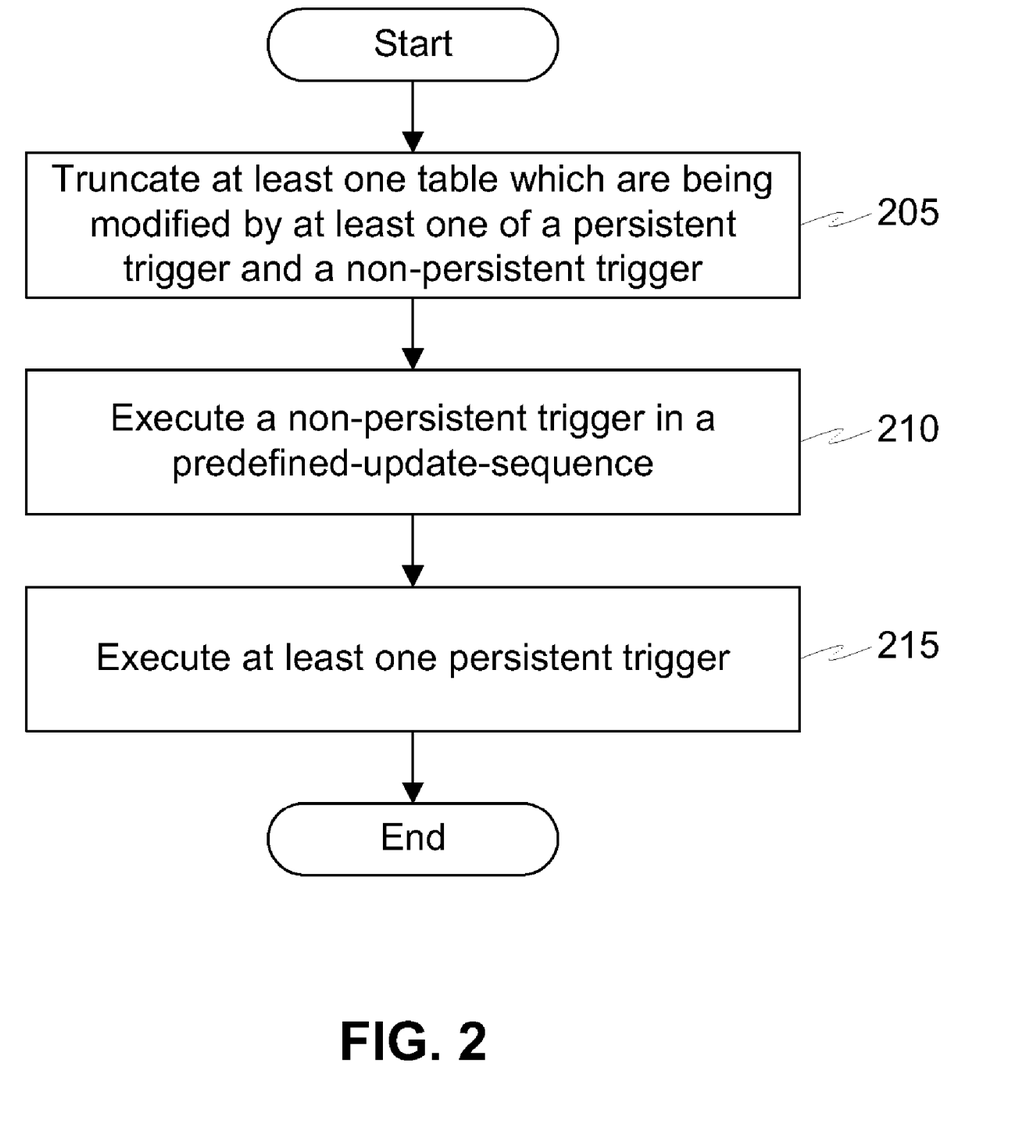
FIG. 2 is a flow diagram of a method for automatic re-population of data in response to detection of at least one script-transaction, in accordance with an embodiment of the invention.

FIG. 2 is a flow diagram of a method for automatic re-population of data in response to detection of at least one script-transaction, in accordance with an embodiment of the invention. The script-transaction is a result of a structural change in the database. A structural change in the database comprises addition of a new secondary table in the database or a change in a structure of a secondary table in the database. The structural change of the secondary table in the database can be a result of one of change in a column name, change in data type of a column, insertion of a new column, change in the order of column, addition of a new column, removal of a column, change in a primary key, change in the columns used for indexing, change in the uniqueness specification of an index, change in the order of an index, modification of a trigger, change in the relationship between the tables or change in the business rule. It will be apparent to a person skilled in the art that the aforementioned scenarios of the structural change in the database are not exhaustive and can include any other scenarios pertaining to structural change, as defined above, in the database. In another embodiment of the invention, the script-transaction can be a result of data corruption in the database. The data corruption can be, for example, any unintentional change in the data of the database, or inconsistency in the data of the secondary tables.

At step 205, at least one table, which is being modified by at least one database trigger, is truncated. In an embodiment of the invention, a table can be updated by at least one persistent trigger and at most one non-persistent trigger.

At step 210, a non-persistent trigger corresponding to each truncated table of the database is executed in a predefined-update-sequence. The non-persistent triggers are executed in the predefined-update-sequence to maintain the referential integrity of data across tables in the database. Since, a table can be updated by a plurality of persistent triggers and at most one non-persistent trigger and a table which is getting affected by the plurality of persistent triggers and a non-persistent trigger can further execute a database trigger on some other table in the database, so the tables are arranged in the predefined-update-sequence in which they are modified by the database triggers. For example, a primary table which is not modified by any database-trigger and which executes a non-persistent trigger on other tables is placed at the beginning of the predefined-update-sequence followed by tables that executes persistent triggers on other tables.

In an embodiment of the invention, an additional table can be created in order to execute the corresponding non-persistent trigger. For example, a database comprises a sales-bill table that stores details corresponding to the sales details of the items and a bill-payment table that stores details corresponding to mode of the payment for the sales of the items. The details pertaining to sales of the items can comprise, for example, but not limited to, an item code, an item name, a sales rate, a sale quantity. The details pertaining to the mode of payment for the sales of the items can comprise, for example, but not limited to, a credit-card-payment or a cash-payment. If an account of the sales corresponding to the items have to be maintained, a journal table to store details pertaining to journal entries for the billing transactions corresponding to the items have to be added to the database. The bill-payment table executes a non-persisted trigger to add the journal table to database to hold the journal entries. Thereafter, the sales-bill table executes a persistent trigger corresponding to each data of the sales-bill table to update the billing transactions in the journal table.

At step 215, at least one persistent trigger corresponding to each truncated table of the database is executed. Those of skill in the art will, however, appreciate that the method of repopulation can also be applied to a specific set of tables in the database and need not be applied on the entire database.

Figure 3:
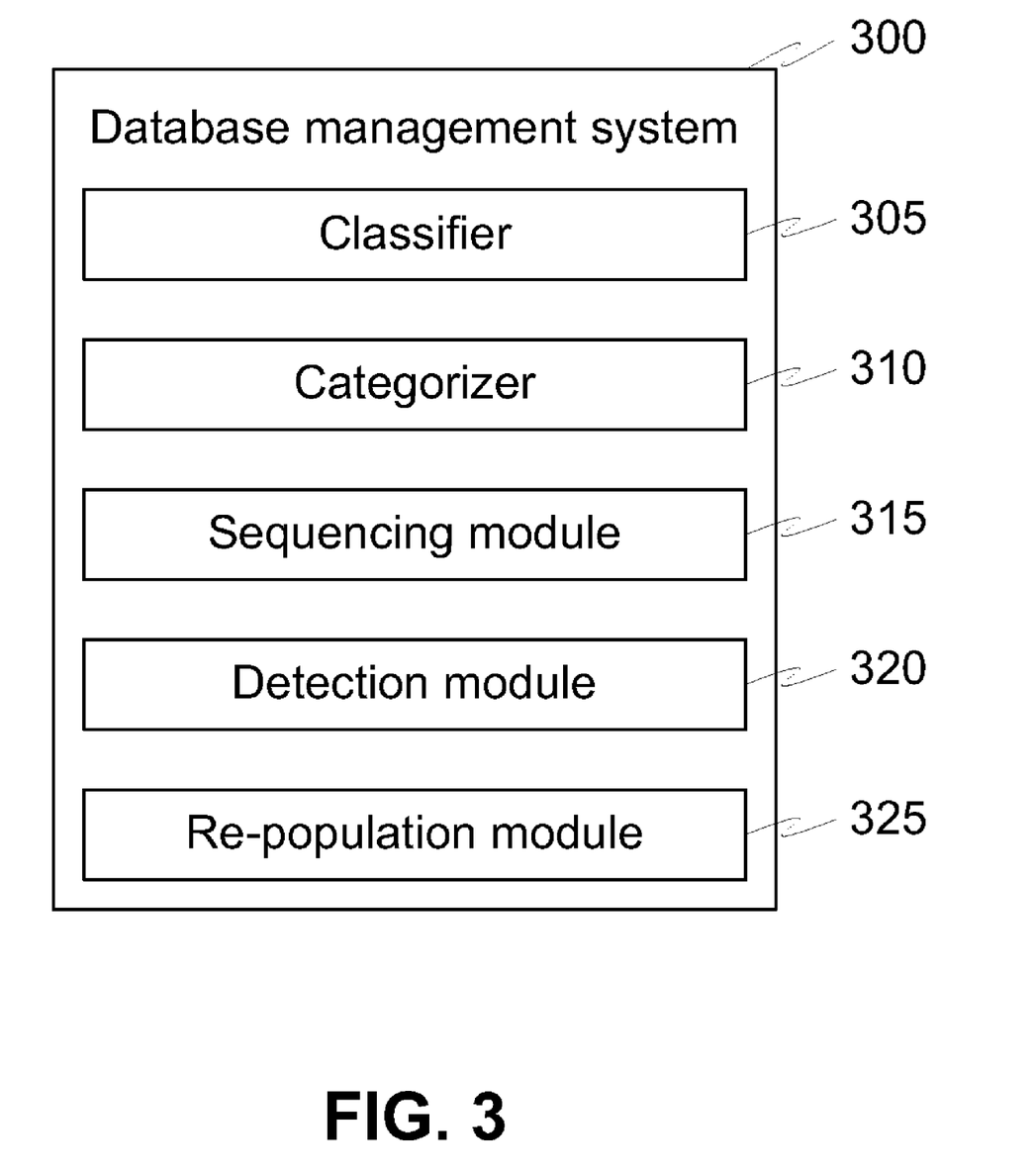
FIG. 3 is a block diagram of a database management system, in accordance with an embodiment of the invention.

FIG. 3 is a block diagram of a database management system 300, in accordance with an embodiment of the invention. The database management system 300 comprises a classifier 305, a categorizer 310, a sequencing module 315, a detection module 320 and a re-population module 325.

Classifier 305 classifies each database trigger into one of a persistent trigger and a non-persistent trigger. The non-persistent trigger generally refers to a database trigger that can perform insert or delete operation on a table of a database. Further, the non-persistent trigger can also update the data in a table of a database. The persistent trigger is a database trigger that can update a data stored in a table of a database. Categorizer 310 categorizes each table into one of a no-trigger-table, a non-persistent-trigger-table and a persistent-trigger-table.

Sequencing module 315 sequences each table into a predefined-update-sequence. In order to maintain referential integrity of data across tables in the database, the tables are modified by the database triggers in the predefined-update-sequence.

Detection module 320 detects at least one script-transaction. In an embodiment of the invention, a script-transaction is carried out in response to a script input. In an exemplary embodiment of the invention, a script-transaction can be a result of structural change in the database or corruption of data in the database. Re-population module 325 re-populates data in the database in response to the detection module detecting the at least one script-transaction. This is further explained in conjunction with FIG. 4.

Figure 4:
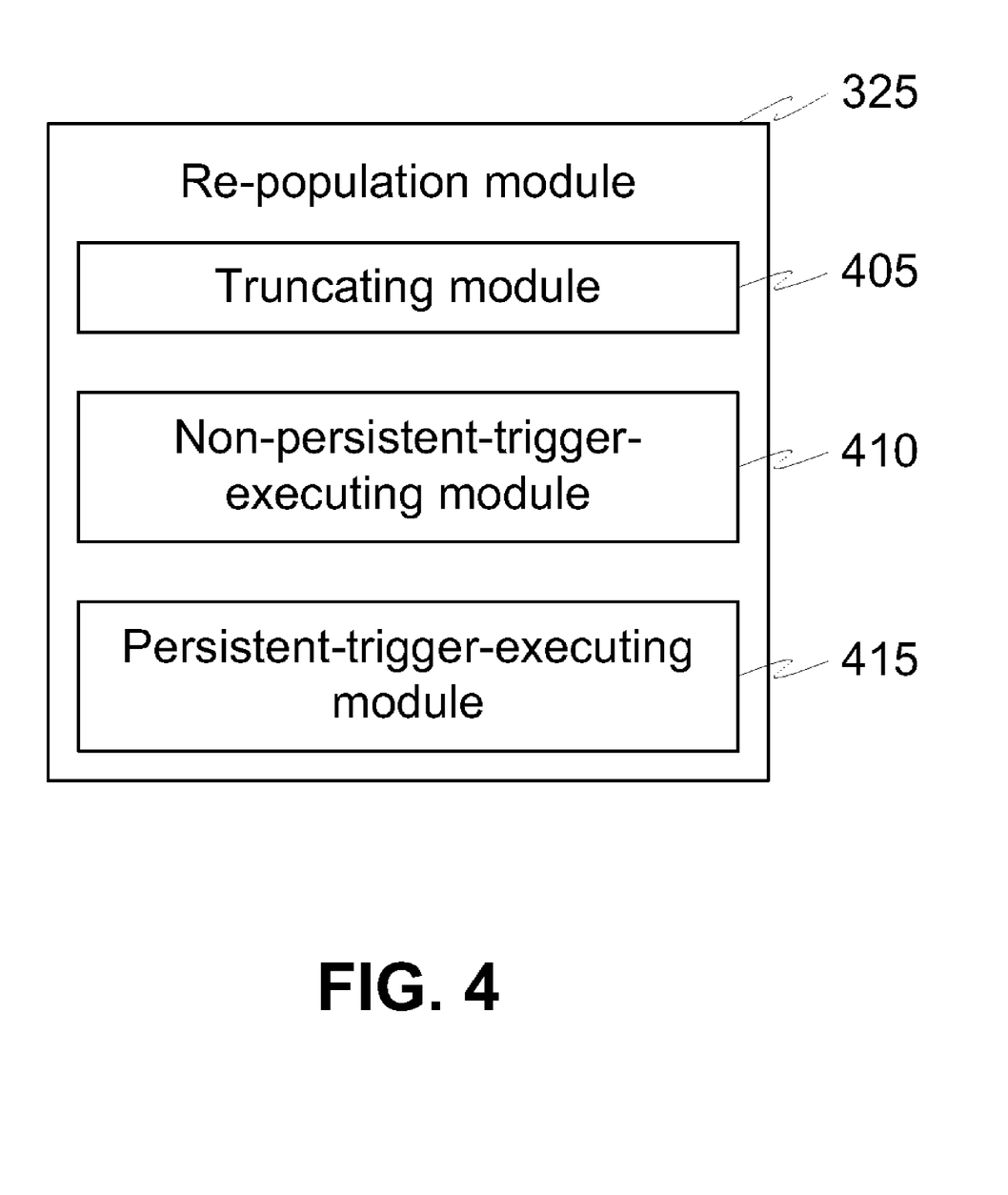
FIG. 4 is a block diagram of a re-population module, in accordance with an embodiment of the invention.

FIG. 4 is a block diagram of re-population module 325, in accordance with an embodiment of the invention. Re-population module 325 comprises a truncating module 405, a non-persistent-trigger-executing module 410 and a persistent-trigger-executing module 415.

Truncating module 405 truncates at least one table of the database, which is being modified by at least one database trigger.

Non-persistent-trigger-executing module 410 executes a non-persistent trigger of a primary table corresponding to each truncated table of the database in the predefined-update-sequence and inserts or deletes the data in each truncated table using the non-persistent trigger.

Persistent-trigger-executing module 415 executes at least one persistent trigger of a primary table corresponding to each truncated table of the database and updates the data of each truncated table.

Figure 5:
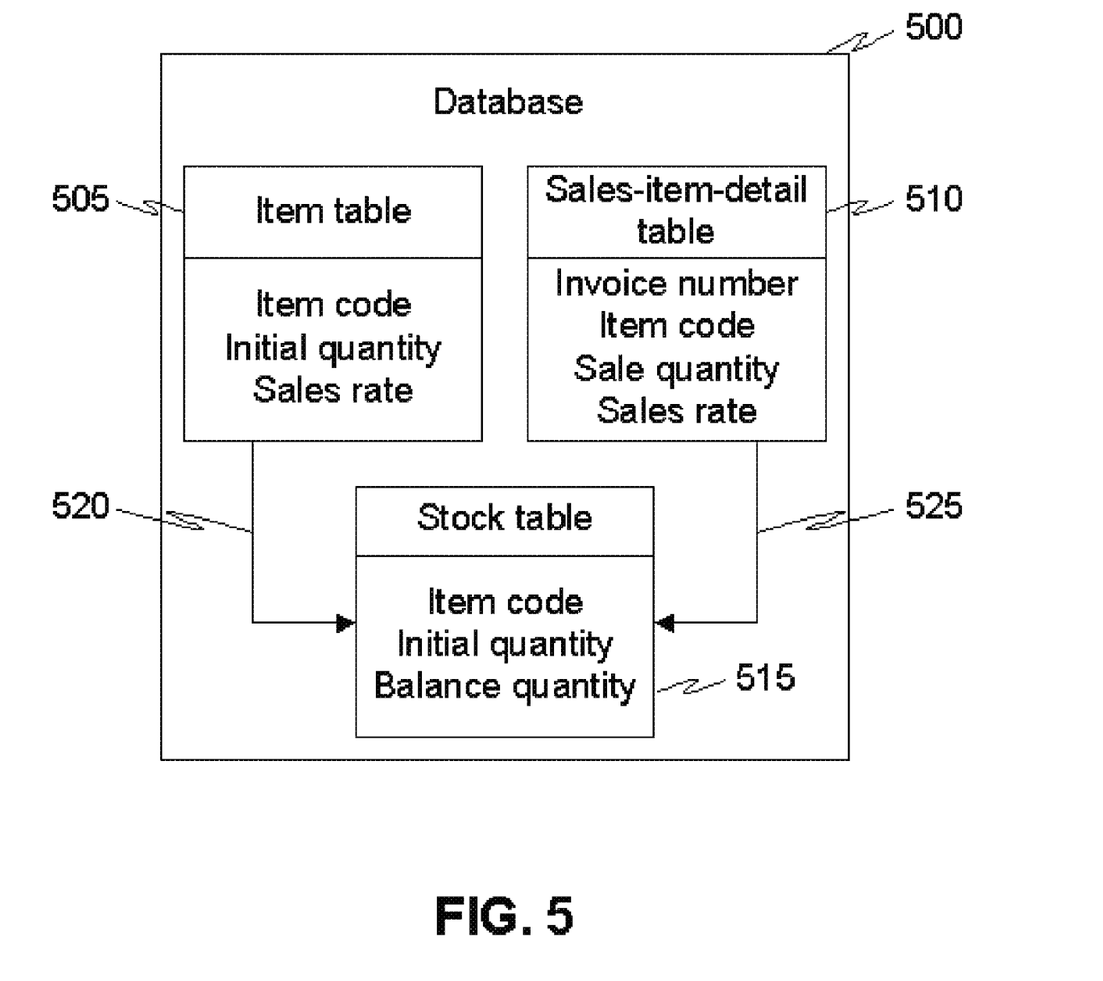
FIG. 5 shows working of a database management system, in accordance with an exemplary embodiment of the invention.

FIG. 5 shows working of a database management system, as discussed in accordance with an exemplary embodiment of the invention. A database 500 comprises an item table 505, a sales-item-detail table 510 and a stock table 515. Item table 505 comprises details pertaining to various items. The details pertaining to an item can comprise, for example, but not limited to, an item code, an item name, an initial quantity and a sales rate. Sales-item-detail table 510 comprises details pertaining to the sales made corresponding to an item. The details pertaining to a sale can comprise, for example, but not limited to, an invoice number, an item code, a sale quantity and a sales rate. Stock table 515 comprises details pertaining to a stock corresponding to an item. The details pertaining to a stock of an item can comprise, for example, but not limited to, an item code, an initial quantity, and a balance quantity. If an item is inserted in item table 505, a corresponding entry needs to be inserted in stock table 515 as well. Item table 505 executes a non-persisted trigger on stock table 515 in order to insert details about the new item in stock table 515. Similarly, when a sale is made corresponding to an item, a new invoice number is added to sales-item-detail table 510. The balance quantity of the item is reduced based on the sale quantity for which the sale is made. In order to maintain referential consistency of the data, the sale quantity needs to be updated in stock table 515. Sales-item-detail table 510 executes a persistent trigger on stock table 515 to update the sale quantity corresponding to the item.

The persistent trigger that is executed by sales-item-details 510 on stock table 515 is defined using the following script:

```
#DEFINE.TRIGGER
{
    #UPDATE PERSISTENT Stock(Stock) USING
    SalesDetail("ItemCode(6)")
    {
        #ON_APPEND
        Stock.SalesQty      += SalesDetail.SalesQty
        Stock.BalanceQty    -= SalesDetail.SalesQty
        #END
        #ON DELETE
        Stock.SalesQty      -=SalesDetail.SalesQty
        Stock.BalanceQty    +=SalesDetail.SalesQty
        #END
    }
}
```

Also, the persistent triggers can be constructed using SQL statements. Those of skill in the art will, however, appreciate that the invention is not limited to these examples, and the invention shall have full scope of the claims.

The non-persistent trigger executed by item-detail table 505 on stock table 515 is defined using the following script:

```
#DEFINE.TRIGGER
{
    #UPDATE Stock(Stock) USING Item("ItemCode(6)")
    {
        Stock.ItemCode      =Item.ItemCode
        Stock.StockQty      =Item.OpenQty
        Stock.BalanceQty    =Item.OpenQty
    }
}
```

Also, the non-persistent triggers can be constructed using SQL statements. Those of skill in the art will, however, appreciate that the invention is not limited to these examples, and the invention shall have full scope of the claims.

In order to re-populate the data corresponding to stock table 515, the data re-population mechanism is applied to database 500 in database management system.

Each table in the database categorized into one of a no-trigger-table, a non-persistent-trigger-table and a persistent-trigger-table. Item table 505 and sales-item-details 510 is categorized as no-trigger-table. Stock table 515 is categorized as a non-persistent-trigger-table. Further, the tables of the database are arranged in a predefine-update-sequence. The predefined-update-sequence is an order in which the tables are modified by the database triggers. Item table 505 is placed at the beginning of the predefine-update-sequence followed by sales-item-details 510 and stock table 515 is placed at the end of the predefined-update-sequence.

As Stock table 515 is modified by a persistent trigger and a non-persistent trigger, stock table 515 is truncated. Each non-persistent trigger corresponding to each entry of item table 505 is executed in order to re-populate the corresponding data in stock table 515. Thereafter, each persistent trigger corresponding to each entry of sales-item-details table 510 is executed in order to update the corresponding data in stock table 515.

The various embodiments of the invention provide a method and a system for automatic re-population of data in a database without writing data migration code for re-populating data corresponding to secondary tables in the database. Further, the size of data back up is very less as only data pertaining to primary tables which are not modified by any database triggers are required for re-population of data in the database. As a result, there is a reduction in the storage space required for the back up. Further, since the storage space required for the back up is very less, the primary tables which are required for re-population of data can be stored in a computing device. The re-population can be done as and when required on the computing device. The computing device can be, for example, but not limited to, a personal digital access (PDA) or a desktop computer. Again, data replication servers need to replicate minimal set of data for the purpose of repopulation of data, as a result the performance is improved. Also, the method and system can further be used for data synchronization in multiple databases reducing the network traffic.

The database management system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

What is claimed is:

1. A database management system, the database management system managing a database, the database comprising a plurality of tables, the database management system comprising:
    a processor; and
    a memory coupled to the processor;
    a. a classifier residing in the memory, classifies each database trigger into one of a persistent trigger and a non-persistent trigger, wherein a persistent trigger updates a table and a non-persistent trigger performs one of an insert operation and a delete operation on a table;
    b. a categorizer residing in the memory, categorizes each table into one of a no-trigger-table, a non-persistent-trigger-table and a persistent-trigger-table, wherein a no-trigger-table is a table that is not modified by a trigger, a non-persistent-trigger-table is a table that is modified by a non-persistent trigger, and a persistent-trigger-table is a table that is modified by a persistent trigger;
    c. a sequencing module residing in the memory, the sequencing module sequencing each table into a pre-defined-update-sequence;
    d. a detection module residing in the memory, the detection module detecting at least one script-transaction, wherein the script-transaction is result of a structural change in the database, the at least one script-transaction being carried out in response to a script input; and
    e. a re-population module residing in the memory, the re-population module re-populating data in the database in response to the detection module detecting the at least one script-transaction.

2. The database management system of claim 1, wherein the re-population module comprises:
    a. a truncating module, the truncating module truncating at least one table, wherein a table of the at least one table is one of the non-persistent-trigger-table and the persistent-trigger-table;
    b. a non-persistent-trigger-executing module, the non-persistent-trigger-executing module, executing a non-persistent trigger corresponding to each truncated table of the database in the predefined-update-sequence; and
    c. a persistent-trigger-executing module, the persistent-trigger-executing module executing at least one persistent trigger corresponding to each truncated table of the database.

3. A method for enabling automatic re-population of data in a database, the database comprising a plurality of tables, the method comprising:
    a. classifying each database trigger into one of a persistent trigger and a non-persistent trigger, wherein a persistent trigger modifies a table and a non-persistent trigger performs one of an insert operation and a delete operation on a table; and
    b. categorizing each table into one of a no-trigger-table, a non-persistent-trigger-table and a persistent-trigger-table, wherein a no-trigger-table is not modified by a trigger, a non-persistent-trigger-table is modified by a non-persistent trigger, and persistent-trigger-table is modified by a persistent trigger.

4. The method of claim 3, wherein a database trigger is one of a plurality of update-trigger, a plurality of delete-trigger and a plurality of insert-triggers.

5. A method for automatic re-population of data in a database comprising a plurality of tables, the method comprising:
    a. truncating at least one table in response to detection of at least one script-transaction, wherein the script-transaction is result of a structural change in the database, and wherein a table of the at least one table is one of a non-persistent-trigger-table and a persistent-trigger-table, and wherein a non-persistent-trigger-table is modified by a non-persistent trigger and a persistent-trigger-table is modified by a persistent trigger, and wherein a persistent trigger updates a table and a non-persistent trigger performs one of an insert operation and a delete operation on a table;
    b. executing a non-persistent trigger corresponding to each truncated table in a predefined-update-sequence; and
    c. executing at least one persistent trigger corresponding to each truncated table for automatic re-population of data in the database.

6. The method of claim 5, wherein the script-transaction is result of data corruption in the database.

7. The method of claim 5 further comprises creating at least one additional table in order to execute the at least one non-persistent trigger.

8. The method of claim 5, wherein a non-persistent trigger further updates a table.

9. The method of claim 5, wherein the structural change in the database is result of a change in a business rule.

10. The method of claim 5, wherein structural change in the database comprises change in structure of at least one secondary table in the database, wherein the at least one secondary table is updated by at least one of the persistent trigger and the non-persistent trigger.

11. The method of claim 10, wherein the at least one secondary table is updated by at most one non-persistent trigger.

12. A computer program product for use with a computer, the computer program product comprising a computer usable medium having a computer readable program code embodied therein for automatic re-population of data in a database comprising a plurality of tables, the computer code performing:
    a. truncating at least one table in response to at least one script-transaction, wherein the script-transaction is result of a structural change in the database, and wherein a table of the at least one table is one of a non-persistent-trigger-table and a persistent-trigger-table, and wherein a non-persistent-trigger-table is modified by a non-persistent trigger and a persistent-trigger-table is modified by a persistent trigger, and wherein a persistent trigger updates a table and a non-persistent trigger performs one of an insert operation and a delete operation on a table;

b. executing a non-persistent trigger corresponding to each truncated table of the database in a predefined-update-sequence; and c. executing at least one persistent trigger corresponding to each truncated table of the database for automatic re-population of data in the database.

* * * * *